United States Patent
Scholz et al.

(10) Patent No.: US 7,075,018 B1
(45) Date of Patent: Jul. 11, 2006

(54) MIXING FIBROUS CONSTITUENTS

(75) Inventors: Erich Scholz, deceased, late of Gorxheimtal (DE); by Rita Scholz, legal representative, Gorxheimtal (DE); by Olaf Scholz, legal representative, Oberflockenbach (DE); Franz Höck, Overath (DE); Peter Engelhardt, Hemsbach (DE)

(73) Assignee: Temafa Maschinenfabrik GmbH, Bergisch-Gladback (DE)

( * ) Notice: Subject to any disclaimer, the term of this patent is extended or adjusted under 35 U.S.C. 154(b) by 0 days.

(21) Appl. No.: 09/701,329

(22) PCT Filed: Dec. 7, 1999

(86) PCT No.: PCT/DE99/03909

§ 371 (c)(1),
(2), (4) Date: May 15, 2003

(87) PCT Pub. No.: WO00/34557

PCT Pub. Date: Jun. 6, 2000

(30) Foreign Application Priority Data

Dec. 9, 1998 (DE) .................................. 198 56 477

(51) Int. Cl.
*G01G 13/02* (2006.01)

(52) U.S. Cl. .................. 177/16; 177/121; 19/97.5; 19/105; 19/145.5; 222/77

(58) Field of Classification Search ........ 177/121–123, 177/16–17, 116; 222/55–56, 77; 19/105, 19/97.5, 145.5; 141/83
See application file for complete search history.

(56) References Cited

U.S. PATENT DOCUMENTS

| | | | |
|---|---|---|---|
| 3,939,929 A * | 2/1976 | Hidaka et al. ............... 177/121 |
| 4,300,201 A | 11/1981 | Wochnowski ............... 702/175 |
| 4,448,272 A | 5/1984 | Keller et al. ................... 177/1 |
| 4,679,641 A * | 7/1987 | Kawakami ................... 177/114 |
| 4,751,974 A * | 6/1988 | Kawakami ................... 177/114 |

(Continued)

FOREIGN PATENT DOCUMENTS

DE            3412920 A1 *   10/1985

(Continued)

OTHER PUBLICATIONS

Patent Abstract of Japan No. 07316965, Dec. 5, 1995.

(Continued)

*Primary Examiner*—Randy W. Gibson
(74) *Attorney, Agent, or Firm*—Dority & Manning, P.A.

(57) ABSTRACT

A method and device for mixing and weighing fibrous material in a weighing cycle includes removing the fibrous material from fiber bales and transporting the fiber material with a feed device into a weighing container. The weighing container is proceeded by a pre-filling chamber that is separated from the weighing container by a controllable flap. After the fibrous material has been weighed, the material is ejected from the weighing container onto a mixing belt. The material feed device is controlled in accordance with a theoretical weight curve that is given for each fibrous material component. Transport speed of the material feed device is varied in accordance with the theoretical weight curve. The theoretical weight curve provides total weight of the transported fibrous material at a given time in the weighing cycle, and is determined for each fibrous material component based on a predetermined relationship of feed rate of the transported fibrous material as a function of time over the course of the weighing cycle in order to achieve a theoretical total weight of fibrous material to be transported into the weighing container during the weighing cycle.

21 Claims, 5 Drawing Sheets

U.S. PATENT DOCUMENTS

| | | | | |
|---|---|---|---|---|
| 4,762,252 | A | * | 8/1988 | Hyer et al. .................... 222/56 |
| 4,766,966 | A | * | 8/1988 | Nagao et al. ................ 177/123 |
| 4,914,787 | A | | 4/1990 | Leifeld et al. ................. 19/145 |
| 4,993,119 | A | * | 2/1991 | Roberson ...................... 19/105 |
| 5,802,674 | A | * | 9/1998 | Barber ......................... 19/105 |
| 6,235,999 | B1 | * | 5/2001 | Rubenach ................... 177/116 |
| 6,360,403 | B1 | * | 3/2002 | Rubenach ................... 19/97.5 |
| 6,545,230 | B1 | * | 4/2003 | Tamai et al. ............. 177/25.18 |
| 6,911,607 | B1 | * | 6/2005 | Klijn .......................... 177/116 |

FOREIGN PATENT DOCUMENTS

| | | | |
|---|---|---|---|
| EP | 392869 A3 | * | 10/1990 |
| EP | 622480 A1 | * | 11/1994 |
| GB | 1044541 | | 10/1966 |
| GB | 2037566 | * | 7/1980 |

OTHER PUBLICATIONS

Patent Abstract of Japan No. 63099330, Apr. 30, 1988.

International Preliminary Examination Report, Sep. 13, 2000.

EPO Serach Report, May 16, 2000.

German Patent Office Search Report, Jun. 29, 1999.

* cited by examiner

MIXING FIBROUS CONSTITUENTS

The invention is relative to a method and a device for mixing fibrous [yarn] components by weighing-box feeding provided with a weighing container and a pre-filling chamber. The weighing container is separated from the pre-filling chamber in front of it by a controllable flap and after the weighing has been completed the material is ejected out of the weighing container onto a mixing belt.

In order to mix fibrous components weighing-box feed devices are used for dosing the individual fibrous components in which devices fibrous bales are supplied via a supply table and a subsequent conveyor belt to a rising needle belt from which bales the needle belt loosen out fibrous material in pancakes and transports them upward toward an evener [stripping] roller. A subsequent knock-over roller supplies the material loosened in this manner to a weighing container.

The weighing of the fibers according to this known, discontinuous method takes place as a rule in such a manner that the weighing container is loaded at two different material feed rates with the feed output being a function of the speed of the needle belt. A coarse dosing takes place at first at a high needle-belt speed in order to fill the weighing container in as short a time as possible. However, the desired weighing weight is achieved only inexactly with this high needle-belt speed. Therefore, this rapid filling is carried out only up to a certain degree of filling. As soon as this first limiting [boundary] value of the coarse filling has been reached the needle belt is shifted to the low speed and the fine dosing follows at this low speed until the desired final weight has been reached. When this second limiting value has been reached the needle belt is halted. The exact weight is subsequently determined by the balance. It is necessary for an exact determination of weight that the balance is at a standstill, that is, that it no longer makes any oscillations caused by the filling. This process can require up to 2 or 3 seconds. The weighing container is emptied thereafter onto a so-called mixing belt and tared, that is, the weighing device is exactly adjusted to the zero point [to zero]. The weighing apparatus is ready therewith for the next weighing and the needle belt is re-engaged in order to carry out at first the coarse filling at a high speed for the next weighing procedure.

In spite of an exact adjustment of the weighing apparatus and an immediate halting of the needle belt, fibers still fall into the weighing container after the reaching of the second limiting value so that the desired weighing value is exceeded and occasionally even not reached. This is especially the case if the fibrous material has been opened only slightly. In order to compensate this impreciseness this weight value is determined and taken into account as concerns its weight in the further weighings. In addition, flaps are provided above the weighing container that close immediately when the final weight has been reached in order to avoid a subsequent filling of fibrous material into the weighing container.

In order to accelerate the weighing cycle a rapid filling of the weighing container is desirable; however, a high needle-belt speed does result in a high throughput but the weighing accuracy is low on account of the poorer opening of the fibrous material since material is entrained and similar events occur. A low needle-belt speed does bring about a better opening and therewith also a high weighing accuracy but the throughput and therewith the filling speed of the weighing container is low. There is therefore the problem of achieving the highest possible throughput during the filling and nevertheless achieving a good opening and a high accuracy during the weighing.

Furthermore, the material-specific properties play a great part in the weighing of fibers. Therefore, all speeds and limiting values must be adjusted to these material-specific properties. The loading of the filling chamber in front of the needle belt also influences the parameters to be adjusted.

As a rule, fiber mixing systems are operated with several weighing containers and with different raw materials. The slowest weighing determines the throughput of the entire production system. In order to achieve the desired accuracies and throughputs in the described weighing process it is necessary that the system is adjusted by operating personnel with a good knowledge of the process and with experience. The adjustment values must be determined empirically for each fiber type, which is expensive.

Electronically controlled weighing devices are already known that significantly simplify the operation and surveillance of such mixing systems; nevertheless, it is necessary to input the appropriate data and empirical values for each component to be mixed into the control device and to store them there and to retrieve them for the control program for the materials ready for processing and for the desired mixtures. This is time-consuming and requires experienced professional personnel. Moreover, there is always the danger of erroneous adjustments. The empirical values have to be tested and determined for new mixtures and materials.

DE 34 12 920 teaches a device for dosing filling material for the filling of packages. The filling of the weighing container takes place in two stages with a coarse dosing and a fine dosing. For the coarse dosing the filling material is conducted via a first feed line into a pre-chamber provided with a blocking device against the weighing container. A volumetric measurement of the filling material in the pre-chamber is provided. When the given volume has been reached the filling of the pre-chamber is terminated and its contents emptied into the weighing container. After the closing of the blocking member between the pre-chamber and the weighing container the fine dosing takes place via a second transport stretch. During this time the pre-chamber can already be re-filled via the first transport stretch so that a shortening of the filling speed for the weighing container occurs. This known device has the disadvantage that two separate filling stretches are necessary for the fine filling and for the pre-filling so that a corresponding flap control and a corresponding feed device are necessary for each filling stretch. The device is therefore relatively expensive.

Furthermore, a method is known for the continuous detection of the bulk weight of granular, fibrous or leaflike material, especially of tobacco, in which the material is delivered in a constant flow by a first transport means to a second transport means and supplied from the latter in a mass-constant flow of material to following preparatory operations (DE 28 41 494). The problem in a discontinuous weighing for mixing fiber components of nevertheless achieving a continuous transport of material and an opening of said material is not present in this known device. The known method and the device provided for carrying it out are also not suitable for combining different fibrous components according to given weight percentages for the further processing.

Finally, U.S. Pat. No. 4,766,966 teaches an electronic control program for filling a weighing container via a pre-filling chamber in as short time as possible but while avoiding excesses of weight caused by the rapid filling. The supplying of the material to be weighed into the weighing container is therefore controlled by a differing opening width of the outlet flap out of the pre-filling container. Nothing can be gathered about the mixing of fibrous components and the feed of material into the pre-filling chamber from the known device. The control of the ejection flap opening entails the danger in the case of fibrous material that the material remains hanging on the incompletely opened flaps and that irregularities and an incomplete filling of the weighing container therefore occur.

The present invention has the problem of eliminating the cited deficiencies and of creating a method and weighing device for significantly simplifying the adjusting and the dosing of the individual components. A further problem of the invention is to achieve a high production output while nevertheless attaining a good opening and a high degree of weighing accuracy. These problems are solved by the features of claims 1, 15 and 17 separately or in combination. Further particulars of the invention are described in detail with reference made to the drawings.

Figure 1:
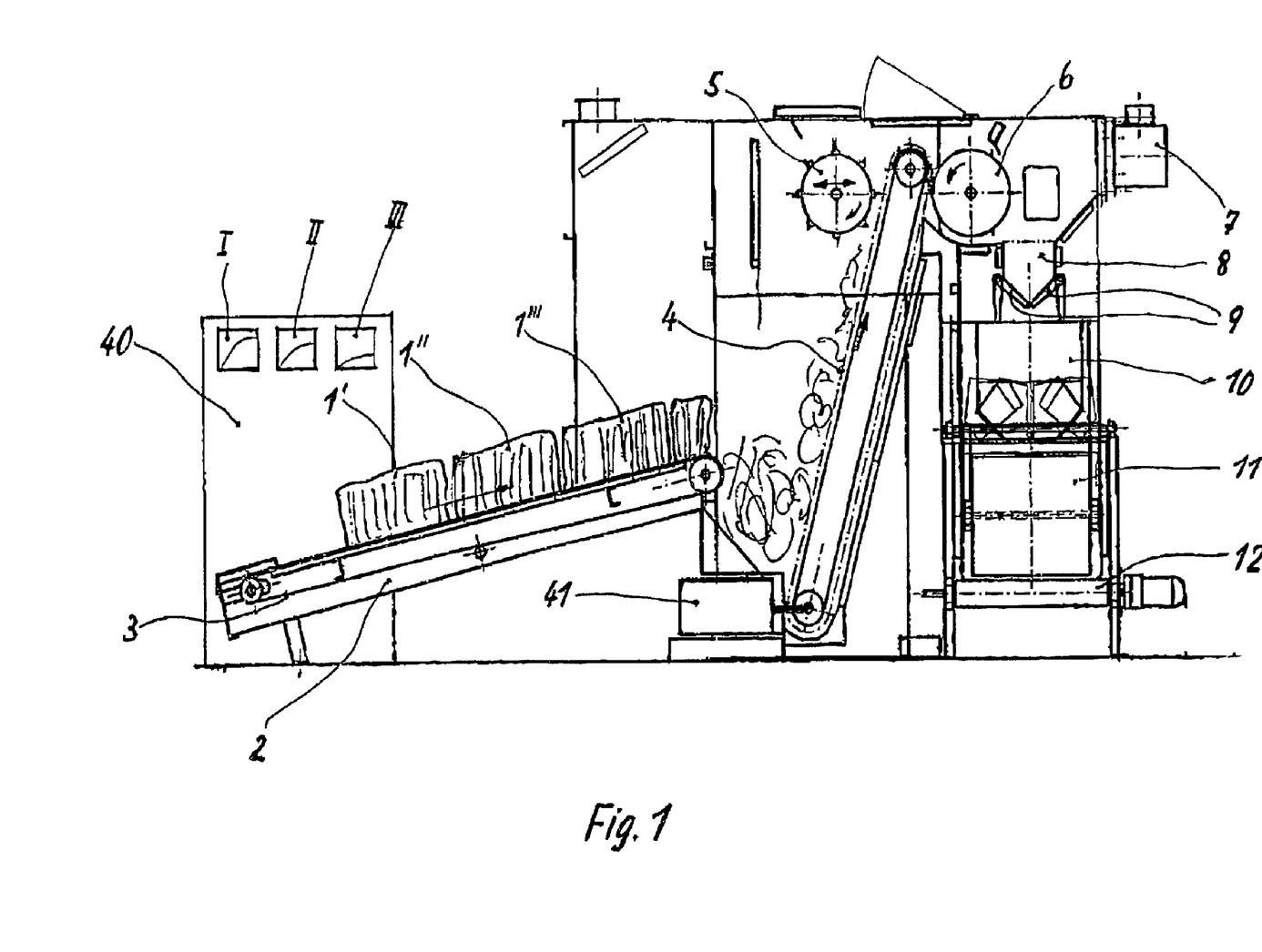
FIG. 1 shows a weighing feeder [automatic hopper-feeder] in a schematic view.

FIG. 1 shows the construction of a weighing feeder in schematic fashion. Bales 1', 1', 1''' are supplied via feed table 2 and its conveyor belt 3 to needle belt 4 that loosens pancakes out of the supplied bales and transports them upward toward evener roller 5. Evener roller 5 is mounted so that it can be adjusted in its interval to needle belt 4 and rotates in the direction opposite that of the transport device of needle belt 4. Fibrous amounts that are too large and rise with needle belt 4 are not let through this interval of evener roller 5 but rather are retained by it. As a rule, conveyor belt 3 of supply table 2 and needle belt 4 are connected to each other by a common drive. Infinitely variable drive 41 is provided for needle belt 4 so that the needle belt can run at every transport speed set by control device 41. Needle belt 4 is followed by knock-over roller 6 that rotates at a high speed, beats the fibrous material out of needle belt 4 and opens it thereby. The fibers or fibrous fluff loosened by knock-over roller 6 are transported into pre-filling chamber 8 that can be closed by flaps 9 and blocked off from weighing container 10. Ventilator 7 assures a suction removal of dust. Mixing belt 12 runs along and below weighing container 10 onto which mixing belt the fibers weighed in weighing container 10 are ejected. Pressure roller 11 is arranged at the end of mixing belt 12 for compressing the fibrous material to a uniform lap [batting] for being fed into mixing opener 13.

Figure 7:
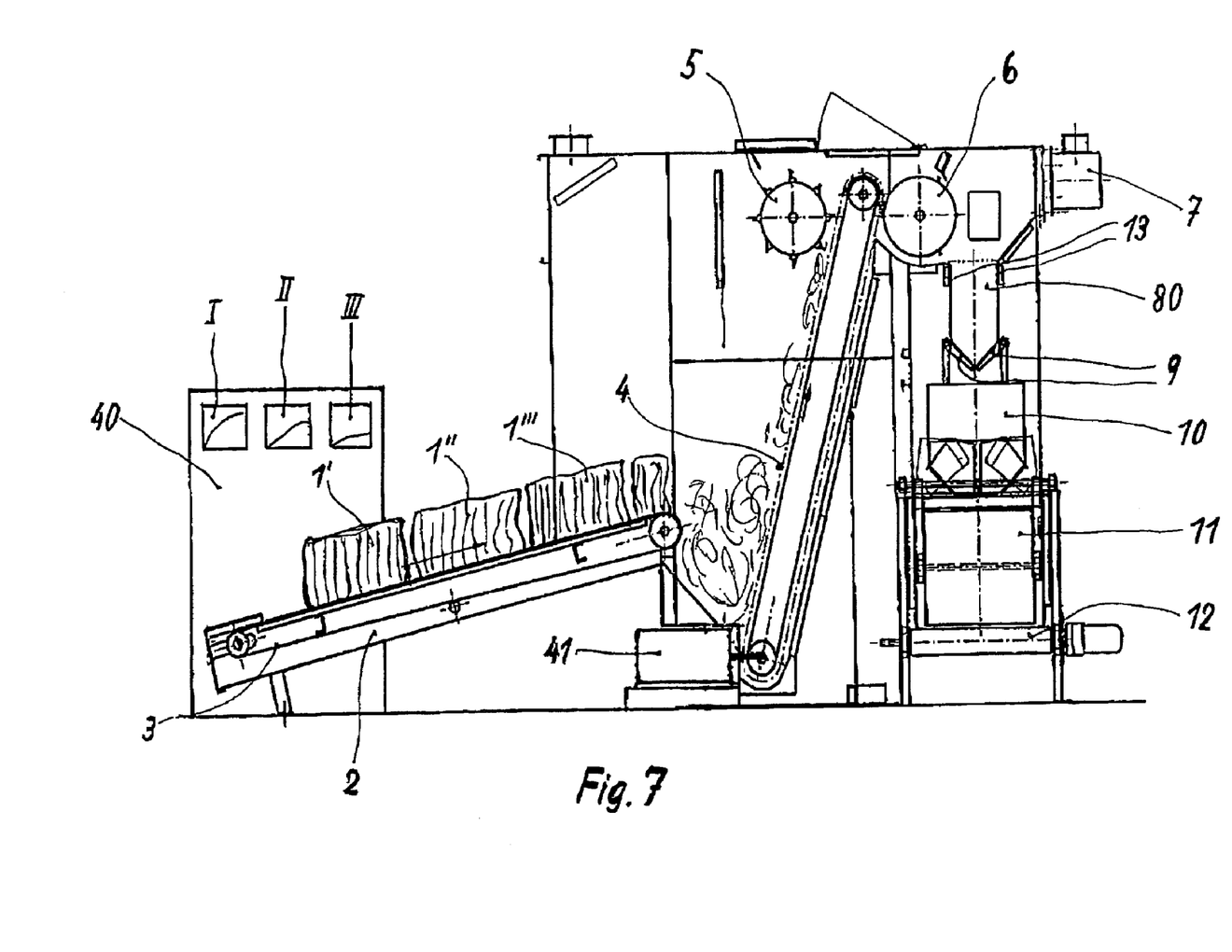
FIG. 7 shows a weighing feeder with enlarged pre-filling chamber.

FIG. 7 shows a weighing feeder with enlarged pre-filling chamber 80. Parts of this weighing feeder with the same function as in FIG. 1 are also designated the same way as in FIG. 1 so that the description of the weighing feeder according to FIG. 1 also applies to FIG. 7. Large pre-filling chamber 80 is arranged above weighing container 10, which chamber has approximately 80% of the holding capacity of weighing container 10. This enlarged pre-filling chamber serves to receive the material delivered during the resting time of the balance and the ejecting of the contents of weighing container 10 onto conveyor belt 12 so that needle belt 4 can transport fibrous material without standing still. Measuring devices 13 are arranged on both sides for monitoring the filling state of the pre-filling chamber.

Figure 2:
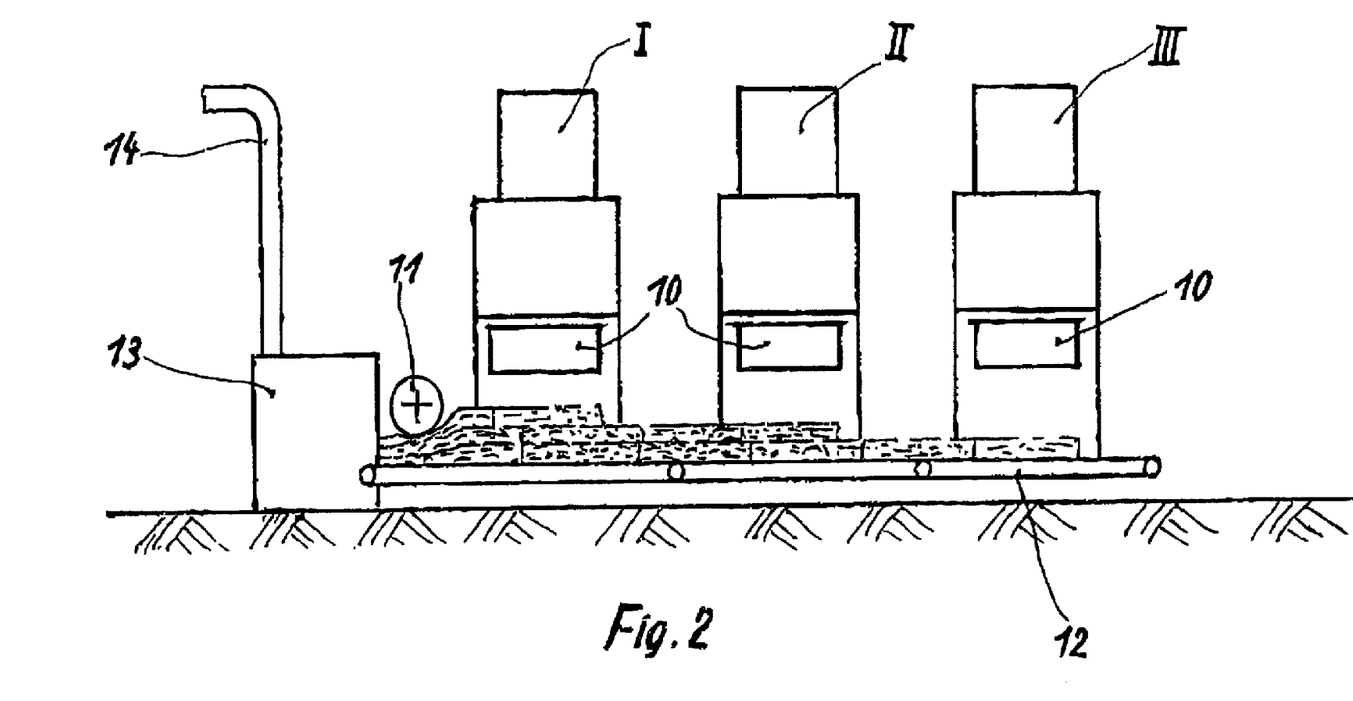
FIG. 2 shows a mixing system with three weighing feeders.

FIG. 2 shows a system with three weighing-box feeders I, II and III, each of which eject a component onto mixing belt 12. The ejection out of weighing containers 10 takes place in such a manner that the portions to be mixed are layered over each other and pass simultaneously to the intake into mixing opener 13. That is, at first weighing feeder III ejects its component portion onto mixing belt 12, that transports this layer to weighing feeder II. There, the next component is placed out of weighing container 10 onto the layer of weighing feeder III and both are transported further to weighing feeder I, that then places the third component onto the two layers. All three layers pass at the end of conveyor belt 12 under and past pressure roller 11 and are fed to mixing opener 13, that continuously mixes the layer packets and delivers them though pipeline 14 to a mixing chamber.

The loading of weighing container 10 takes place in the known device in such a manner that in a first phase the material transport runs rapidly without weight control, that is, blocking flaps 9 are closed and the material collects in pre-filling chamber 8. During this time the bottom flap of weighing container 10 closes after the ejection of the last weighing and a taring takes place when the bottom flap is closed. In a second phase the material transport still runs rapidly and without weight control but blocking flap 9 opens and throws the collected material into weighing container 10, whose bottom flap is closed. In a third phase a filling of weighing container 10 up to a certain filling amount that is less than the theoretical weight now takes place with a rapid transport of material. A signal is initiated that switches the material transport to a low speed at which the remaining filling takes place to the final weight. Once the final weight has been reached the material transport is cut off and blocking flaps 9 are closed. A rest period of approximately 2 seconds to the measurement of the final weight takes place. Finally, the bottom flap is opened while the material transport is still cut off and flaps 9 are closed and the weighed material is ejected onto mixing belt 12.

The pre-filling serves to raise the production output by reducing the standstill times of the material transport since when blocking flap 9 is closed in the first two phases the material transport can already start again. However, the pre-filling function according to the known method cannot be used if the material transport speed is subject to significant fluctuations.

These disadvantages are eliminated by the method in accordance with the invention. The supply of material does take place at different speeds; however, it is constantly in operation so that no standstill times arise. This has the great advantage that as a result of the distribution of the supply of material onto a larger time period that was otherwise occupied by the standstill times the work can be carried out at lower material transport speeds that result in a significantly better opening and more precise dosing. An adjusting of the individual parameters is eliminated as further subject matter of the invention since the individual speeds for material transport and filling including the time intervals within the weighing cycle optimize themselves [are optimized automatically] and adjust simultaneously to the different materials.

The method of operation in accordance with the invention is as follows:

At first, the desired course of a weighing cycle is fixed [retained] in a so-called unit curve. This cycle originated from the sum of many empirical values and also represents percentage-wise the material feed percentage-wise [sic] over the time of a weighing cycle subdivided into time sections. After the needle-belt speed of the weighing feeder is approximately proportional to the amount of transported material this unit curve represents in percentage the approximate course of the needle belt speed and therewith of the material feed or transported amount per time unit. It was surprisingly determined that the optimal course of the material feed speed behaves approximately the same in all instances so that this curve can be readily transferred in the representation of percentage to all concrete values. This has the great advantage that the course of the weighing cycle and therewith a significant parameter is entered into control device 40 with the unit curve so that only the weighing time and the final theoretical weight to be observed have to be entered for the concrete individual instance. Of course, a computer integrated into control device 40 can also determine these two values directly from the desired production output. Since the filling capacity of weighing container 10 is given, the computer calculates the necessary number of weighing cycles and their time as well as the theoretical weight to be set for each weighing cycle. Using the set theoretical weight, the computer calculates the theoretical weight curve (FIG. 4) via the unit curve (FIG. 3) according to which theoretical weight curve the filling of weighing container 10 is controlled via a comparison of theoretical value and actual value by a corresponding variation of the fiber delivery into weighing container 10. The needle belt speed is advantageously regulated thereby in such a manner by drive 41 that the standstill of needle belt 4 does not take place or takes place only in exceptional instances so that the material transport extends over the entire weighing cycle. This is made possible by pre-filling chamber 80 (FIG. 7), that is dimensioned to be as large as possible and is at least half as large, in the best instance approximately ⅔ to exactly as large as weighing container 10 and is therefore capable of receiving a continuing supply of material even during the resting phase of the balance and the ejecting of the final weight out of weighing container 10. Solely the fine filling amount does not need to be received by the pre-filling chamber since this amount falls directly into weighing container 10 when flaps 9 are open. This achieves not only a significantly more rapid filling and therewith also a greater performance [output] of the weighing feeder but also a better fiber opening and a more exact filling is achieved as result of the now possible lesser filling speed. Of course, the saving of the standstill times of the material feed can also be utilized to shorten the duration of the weighing cycle and the output can be increased as a result thereof without the quality of the opening suffering thereby.

The weighing cycle is divided essentially into three phases, namely, (FIG. 6) into pre-filling (zone A), main filling (zone B) and fine filling (zone C). This is augmented by the standstill time (zone D). Given the appropriate size of pre-filling chamber 8 or 80 the main filling can be entirely eliminated so that the weighing cycle is subdivided only into pre-filling (zone A+B+C) and fine filling (zone D). The pre-filling takes place with closed flaps 9 in pre-filling chamber 8 or 80. During this so-called pre-filling the resting time of the balance and the measuring of the final weight as well as the opening and ejecting of the final weight onto mixing belt 12 including the optionally necessary taring of the balance take place. The fine filling always takes place after the pre-filling chamber has been emptied and with open flaps 9 in order to bring the balance to the final weight. In this manner up to 2 or 3 seconds can be saved, which means a reduction of the transport speed and an increase of performance of 15–25% in a customary weighing cycle of 12–14 seconds.

Figure 3:
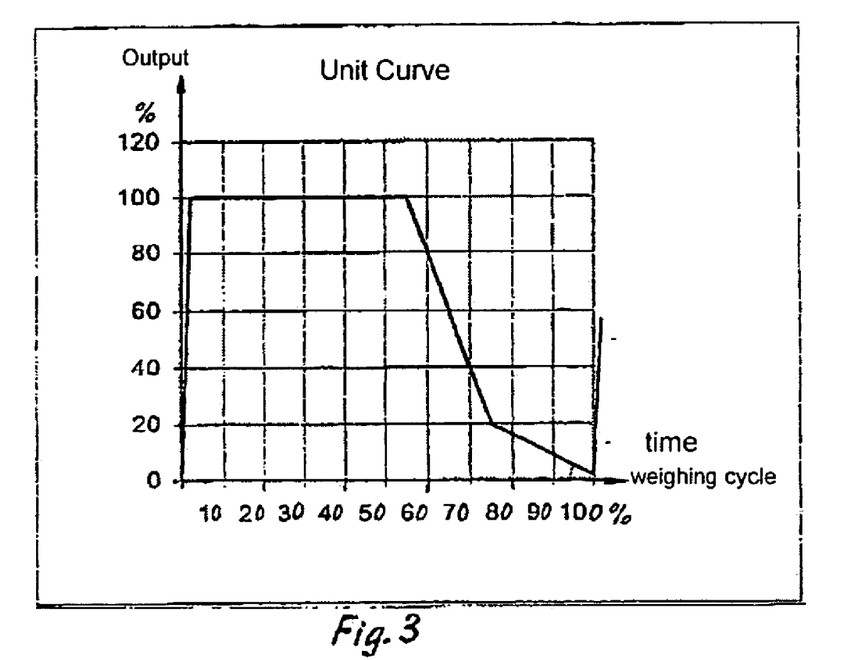
FIGS. 3, 4 and 5 show different curves according to which the adjustment and the control of the system take place.
Figure 4:
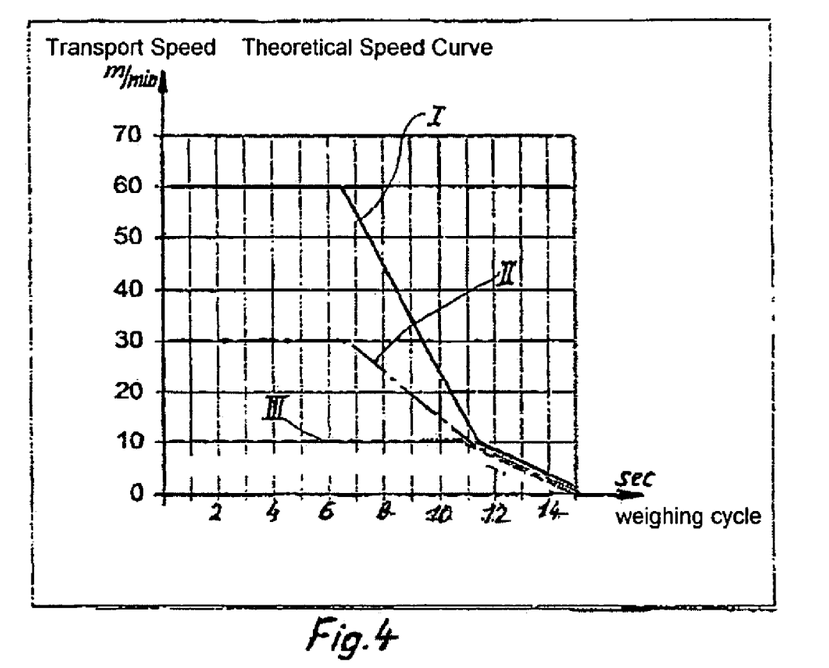

FIG. 3 shows the unit curve for a weighing cycle without standstill time of the material feed. As is apparent from FIG. 3 the transported amount at the beginning of the cycle is approximately 100%. This transported amount is maintained over approximately 60% of the time of the weighing cycle. The transported amount is then lowered to approximately 20% and the fine dosing carried out to the final weight for the remaining 20 to 25% of the weighing cycle time with a decreasing of the transported amount. The area under the unit curve represents the total transported amount to be achieved during the weighing cycle and ejected as final weight onto mixing belt 12. The theoretical weight curve (FIG. 5) results by integration of this unit curve. The unit curve is fixed thereby for each mixing component I, II and III with 100% representing the transported amount necessary for achieving the theoretical weight of the corresponding component during the weighing cycle time. After [when; since] all three components for the weighing cycle have the same time the necessary theoretical speed curve is a function of the theoretical weight to be achieved. Thus, component I has the highest theoretical speed, in the example here with 60 m per minute, component II with 30 m per minute and component III with approximately 10 m per minute. This corresponds approximately to the mixing ratio of the components of 60:30:10.

Figure 6:
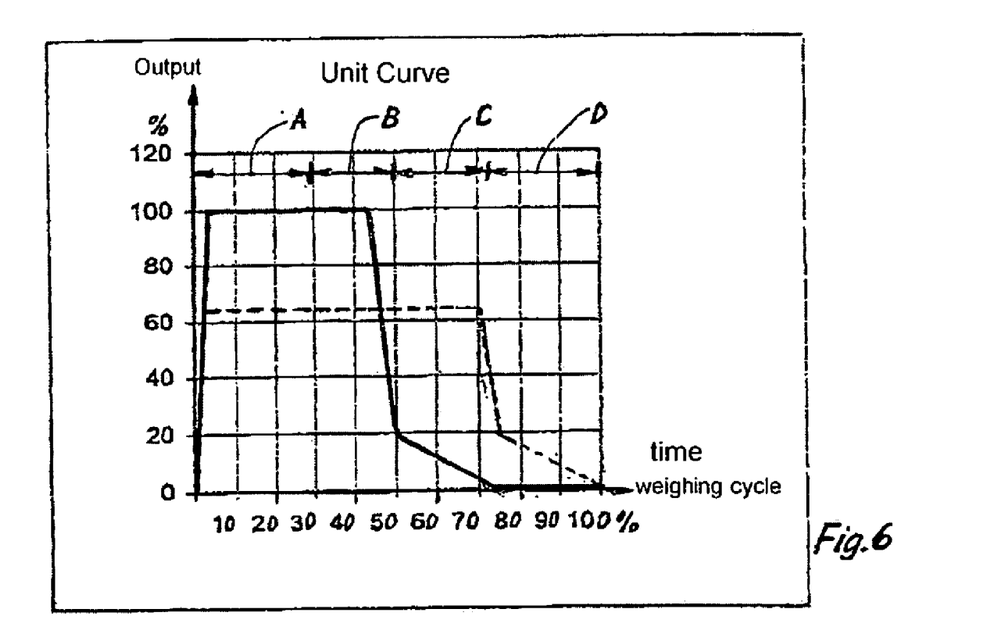
FIG. 6 shows a comparison of the transported amount with and without interruption of the transport.

However, the control of the mixing process via a theoretical weight curve derived from the unit curve can also be carried out in the customary weighing cycle with standstill of the material transport during the resting time and the weighing. However, FIG. 6 shows in a comparison what enormous advantages the elimination of the standstill times has in favor of a continuous feeding of material. The heavy unit curve represents the weighing cycle with the customary standstill time. Zone A indicates the customary pre-filling time, zone B the main filling whereas zone C indicates the fine dosing and, finally, zone D the standstill time of the feeding. The percentage numbers indicate a customary course of the weighing cycle as example. It is immaterial thereby whether the weighing cycle last 12 seconds or 16 seconds. In the present instance the example was taken from the weighing cycle of 14.5 seconds. As is apparent from FIG. 6 the standstill time is at least [nevertheless] 25 to barely 30%. By avoiding the standstill time for the feeding of material given an appropriately large pre-filling chamber 80 the transport speed can be lowered to approximately 60% or, utilizing the full transport speed, a shortening of the weighing cycle of 25% can be achieved. Since the areas under the particular curve represent the amount of theoretical weight, it is clear what an advantage the method in accordance with the invention offers.

The pre-filling takes place at a material transport speed determined in such a manner that the available pre-filling chamber 8 or 80 is well utilized and optimally loaded in the given or available time. If the size of pre-filling chamber 80 (FIG. 7) is approximately 60 to 80% of weighing container 10 the essential filling takes place in this pre-filling time. After the opening of flaps 9 this pre-filling amount passes into weighing container 10 and merely a fine filling at a low transport speed is still required in order to exactly achieve the desired final weight.

Figure 5:
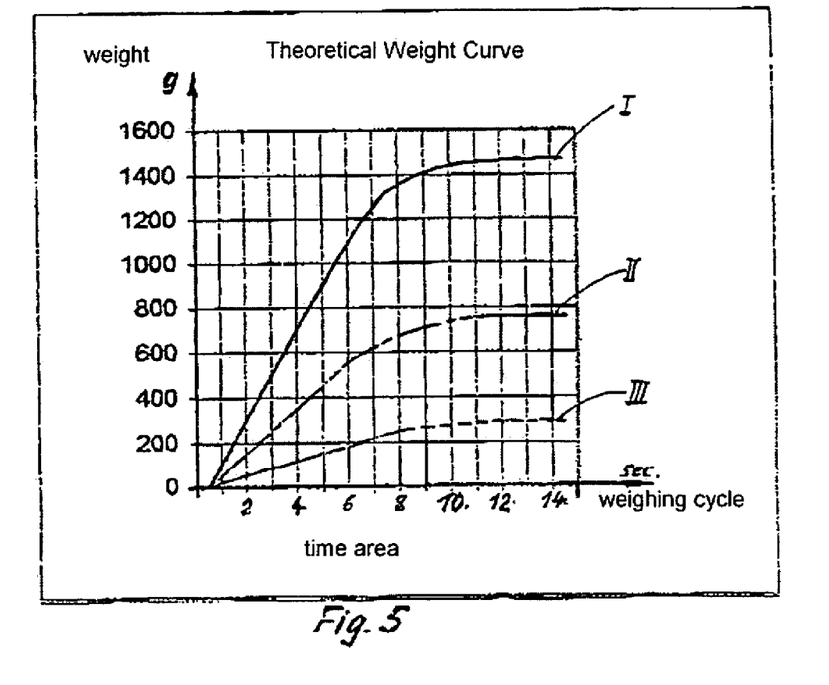

The material transport begins with the transport speed (FIG. 4) conditioned by the theoretical weight curve (FIG. 5). A comparison of the theoretical/actual values with the given theoretical weight curve determines which amount is still to be filled to the final weight. If the differential amount is very great the material transport speed can also rise again to 100% and be regulated down to the fine transport for the last 10 or 20%. However, the goal is to carry out the filling with as uniform a transport speed as possible so that the transport speed is already totally adapted for this pre-filling time in the following cycle. As soon as the final weight has been reached, flaps 9 close and cut off any further feed of material. However, the transport of material does not cut off but rather immediately begins to fill pre-filling chamber 8 or 80 again while the balance carries out its resting time and weighing and ejects the weighed material.

In order to make optimal use of pre-filling chamber 8 or 80 it is necessary to determine the proper speed for the supplying of material during this pre-filling period because this speed can deviate from the theoretical speed (FIG. 4) determined from the theoretical weight curve by virtue of the particularity of the material. This can basically also be performed manually and by inputting empirical values. However, it is also possible that the weighing device optimizes itself here. This takes place in the following manner:

According to a given basic adjustment the transport of material begins in the first weighing cycle with a transport speed of approximately 50%. Then, depending on the size of pre-filling chamber 8 or 80, a check is made after a weighing time of approximately 60% of the weighing cycle to see what amount of material has passed into pre-filling chamber 8 or 80 at the globally adjusted pre-filling speed. This is naturally a function of the material; however, this dependency on the material is automatically included in this measuring since the actual amount is measured as a function of the transport speed during this pre-filling.

This check can take place in various ways. One method consists, for example, in that opening blocking flaps 9 causes the pre-filling amount that had been filled in up to that point to be ejected into weighing container 10 so that the latter can determine an intermediate weight that is passed on to the computer, that compares this weight with the theoretical weight. If this actual value is below the theoretical value, this means that the 50% filling speed is too low and must be increased in accordance with the difference between the actual value and the theoretical value. The computer sets the proper delivery speed already for the next weighing cycle so that optimal utilization of pre-filling chamber 8 or 80 takes place. If the pre-filling amount is too high the speed is correspondingly lowered. This renders the customary adjustment measures superfluous. This process can also be repeated in order to fine-tune it.

Another way of optimizing the pre-filling speed consists in providing pre-filling chamber 8 with a measuring device for the degree of filling (measuring sound, light barrier, etc.). Pre-filling chamber 8 is filled until the measuring device reacts and indicates the filling of the chamber, as a result of which flaps 9 open. At the same time the time required is determined and the optimal filling speed is calculated and adjusted therefrom in the computer in that the basic adjustment is raised or also lowered. In this method of pre-filling amount can subsequently be brought to the final weight and utilized as the first weighing.

In order to avoid an overfilling of pre-filling chamber 8 it is purposeful to start in the optimization of the transport speed from a transport speed that is so low that the complete filling of pre-filling chamber 8 or 80 is reliably not yet reached. As a rule this is achieved with approximately 50% of the transport speed. Then, in the first weighing cycle the optimal starting speed of needle belt 4 or the transport speed is determined after approximately 25 to 70% of the weighing cycle time by a comparison of the actual weight with the theoretical weight, as already described above.

Of course, it can also be provided that the transport speeds determined for certain materials and component compositions are stored are retrieved upon a repetition of the same instance without a corresponding optimization having to be carried out again. However, as a rule an automatic self-optimization is more advantageous because erroneous adjustments are avoided and the personnel does not have to be concerned with the adjustment of the proper pre-filling speed.

In the following weighing cycles the optimal transport speed is fixed after the optimization. As soon as the pre-filling has been achieved the control switches over to the filling speed given by the theoretical weight curve. The curve is controlled along this curve by a regulator that advantageously acts on the delivery speed of needle belt 4 so that a corresponding decrease of the filling speed also occurs in order to perform the fine dosing upon reaching the final weight. As soon as this final weight has been reached the cycle for the material feed is already ended and the speed of conveyor belt 4 is switched after the closing of flaps 9 to the optimized transport speed, wherewith the pre-filling process and therewith the new weighing cycle begin. Thus, while pre-filling chamber 8 or 80 is already being filled with material again the weighing device with weighing container 10 remains in the resting time and after this time has elapsed the weighed material is ejected on to mixing belt 12 by opening weighing container 10.

The deviation of the actual weight from the theoretical ejection weight is of course determined even in this weighing process at the end of the weighing cycle and taken into account in the following weighing cycles. This can take place, as his customary, in accordance with the weight; however the transport speed can also be influenced in order to optimize the procedure. This takes place in such a manner that the course of the weighing cycle remains the same according to the unit curve; however, the calculated correction speed is set equal to 100% of the transported amount and the setting [indication] of the theoretical weight curve and the theoretical speed curve derived from it is corrected therewith. A very precise weighing is achieved in this manner.

As is apparent from FIG. 2, usually several components are to be combined and mixed for the mixture. A weighing feeder I, II or III is provided for each component. Thus, in the present instance three components can be mixed. Since the individual proportions of the components have different magnitudes the filling of weighing container 10 takes different times in the usual known filling methods so that the component that determines the greatest proportion also requires the longest time so that the two other weighing feeders have terminated their weighing process beforehand and must wait with the ejection of their weight amount on the weighing feeder with the greatest amount. According to the invention these three weighing feeders are coordinated in such a manner with one another as regards their filling speed that all three weighings are completed at the same time. As a result of the fact that the theoretical weight curve is determined from the unit curve for each component and given to the particular weighing feeder the speed curve is correspondingly lowered for the filling speed. The pre-filling takes place more slowly, during which, however, the filling to the final weight can also be retained independently of the pre-filling speed so that the same time period is filled out as in the case of the largest component. Since the given theoretical weight curve is derived from the unit curve the weighing cycle develops here percentage-wise in the same manner as in the case of the largest component. A special adjustment is not required for this. The unit curve is given in each control device or in the control device of the entire system. Thus, only the desired production output or the weighing cycle and the desired final weights for the individual components need to be entered. Everything else including the optimization of the process is carried out by the computer of the control.

In order to always have the same mixture at the beginning as well as at the end of a mixing batch the control can also be programmed in such a manner that the ejection of the weighed fiber amounts begins successively and ends successively so that complete mixture packets are always produced. In the example of FIG. 2 weighing feeder III will therefore eject its last weighing [weighed material] onto mixing belt 12 and then halt its operation already. The last ejected amount then passes to weighing feeder II, that ejects its component onto this last weighing of weighing feeder III and then also halts its activity. The mixing system is not turned off until this mixing packet has also passed the last weighing feeder I. The start takes place in the same manner in that weighing feeder III begins and weighing feeders II and I are successively cut in.

In the example described the process control was described by setting [indicating] a desired theoretical weight curve according to which the feeding of material into weighing container 10 is controlled. This theoretical weight curve can also be determined empirically; however, it is advantageous to determine it in accordance with the invention via the unit curve.

The optimizing of the transport speed, especially for the pre-filling, is significant not only in conjunction with the larger pre-filling chamber 80, that can receive practically the entire filling amount up to the residual filling for the fine dosing. Enlarged pre-filling chamber 80 can also be successfully used in the traditional, known weighing processes and significantly shorten the process and lower the required transport speed.

As is apparent from FIG. 6 from the continuous heavy curve it is absolutely possible to indicate a unit curve even for the traditional weighing process with standstill (area D) to [of] the material transport and to control the cycle in accordance with it.

Thus, these parts of the invention acquire independent significance; however, the optimum is achieved by using all these described parts together. The described embodiments are only exemplary and can be varied in various ways or combined in a different manner without departing from the concept of the invention.

The invention claimed is:

1. A method for mixing fibrous components by means of weighing feeding in a weighing cycle wherein the fibrous material to be dosed is removed from fiber bales and transported by a material feed device into a weighing container preceded by a pre-filling chamber, which weighing container is separated from the pre-filling chamber by a controllable flap, and after the weighing has taken place the material is ejected from the weighing container onto a mixing belt, characterized in that a desired theoretical weight curve is given for each fibrous component to a respective weighing device according to which curve the material feed for filling the weighing container during the weighing cycle is controlled by appropriately varying the transport speed, said theoretical weight curve providing total weight of the transported fibrous material at a given time in the weighing cycle and is determined for each fibrous material component based on a predetermined relationship of feed rate of the transported fibrous material as a function of time over the weighing cycle to achieve a theoretical total weight of fibrous material to be transported into the weighing container during the weighing cycle.

2. A control device for controlling the transport speed of a material feed device of a weighing feed device for mixing fibrous components in which the fibrous material to be dosed is transported by the material feed device into a weighing container during a weighing cycle, characterized in that a desired theoretical weight curve is entered into the control device for the fibrous material to be dosed according to which curve the control device controls the material feed device for the filling of the weighing container by varying the transport speed, said theoretical weight curve providing total weight of the transported fibrous material at a given time in the weighing cycle and is determined for each fibrous material component based on a predetermined relationship of feed rate of the transported fibrous material as a function of time over the weighing cycle to achieve a theoretical total weight of fibrous material to be transported into the weighing container during the weighing cycle.

3. The method according to claim 1 characterized in that the duration of the weighing cycle is the same for the individual components.

4. The method according to claim 1 characterized in that the weighing cycle is subdivided into a pre-filling phase during which the transported material is caught in a pre-filling chamber and into a fine filling phase during which the transported material passes through the pre-filling chamber directly into the weighing container.

5. The method according to claim 1 characterized in that the variation of the material feed takes place by altering the transport speed of a needle belt that transports the fibrous material to the pre-filling chamber.

6. The method according to claim 1 characterized in that the adaptation of the actual weight to the theoretical weight given by the theoretical weight curve takes place by means of a regulator.

7. The method according to claim 6 characterized in that the regulator influences transport speed of a needle belt that transports the fibrous material to the pre-filling chamber.

8. The method according to claim 1 characterized in that the time of the weighing cycle is determined by the speed of the mixing belt.

9. The method according to claim 1 characterized in that the ejection of the weighed amounts of fiber onto the mixing belt begins successively and ends successively so that complete mixing packets are always produced.

10. A method for mixing fibrous components by means of weighing feeding in which the fibrous material to be dosed is removed from fiber bales and transported by a material feed into a weighing container preceded by a pre-filling chamber, which weighing container is separated from the pre-filling chamber in front of it by a controllable flap, and after the weighing has taken place the material is ejected from the weighing container onto a mixing belt, characterized in that a desired theoretical weight curve is given for each fibrous component to a respective weighing device, according to which the material feed for filling the weighing container is controlled by appropriately varying the transport speed, such that in order to determine the optimal transport speed the transport speed of the material feed is adjusted for the first weighing cycle after the setting of an empirical value and after about 25 to 70% of the weighing cycle time the actual value reached is compared with the theoretical value and the difference determined in this manner is utilized to correct the transport speed of the material feed.

11. The method according to claim 10, characterized in that the empirical value for the optimization of the transport speed is approximately 50%.

12. The method according to claim 10 characterized in that the transport speed remains unchanged for the fine dosing independently of the changing of the transport speed for the material transport during the pre-filling and/or main filling.

13. A method for mixing fibrous components by means of weighing feeding in which the fibrous material to be dosed is removed from fiber bales and transported by a material feed into a weighing container preceded by a pre-filling chamber, which weighing container is separated from the pre-filling chamber in front of it by a controllable flap, and after the weighing has taken place the material is ejected from the weighing container onto a mixing belt, characterized in that a desired theoretical weight curve is given for each fibrous component to a respective weighing device according to which curve the material feed for filling the weighing container is controlled by appropriately varying the transport speed such that at the end of the weighing cycle the deviation of the actual weight from the theoretical ejection weight is determined and the difference is taken into consideration for the correction of the transport speed.

14. A method for mixing fibrous components by means of weighing feeding in which the fibrous material to be dosed is removed from fiber bales and transported by a material feed into a weighing container preceded by a pre-filling chamber, which weighing container is separated from the pre-filling chamber in front of it by a controllable flap, and after the weighing has taken place the material is ejected from the weighing container onto a mixing belt, characterized in that the material feed transports fibrous material during the entire weighing cycle as the loading of the weighing container takes place discontinuously.

15. The method according to claim 14 characterized in that the transport speed of the material feed drops towards zero toward the end of the fine dosing but the full transport speed is reassumed immediately after the closure of the blocking flaps.

16. A weighing feed device in which fibrous material to be dosed is transported by a material feed device into a weighing container preceded by a pre-filling chamber and in which the weighing container is separated from the pre-filling chamber by a controllable flap, characterized in that the material feed device is associated with a control device that controls the transport speed of the material feed during a weighing cycle in accordance with a given theoretical weight curve, said theoretical weight curve providing total weight of the transported fibrous material at a given time in the weighing cycle and is determined for each fibrous material component based on a predetermined relationship of feed rate of the transported fibrous material as a function of time over the weighing cycle to achieve a theoretical total weight of fibrous material to be transported into the weighing container during the weighing cycle.

17. The device according to claim 16 characterized in that the material feed device comprises a needle belt that loosens fibrous material out of the supplied bales and is provided with an infinitely variable drive.

18. The device according to claim 16 characterized in that the holding capacity of the pre-filling chamber corresponds to the holding capacity of the weighing container.

19. A method for mixing fibrous components by means of weighing feeding in which the fibrous material to be dosed is removed from fiber bales and transported by a material feed into a weighing container preceded by a pre-filling chamber, the holding capacity of which is approximately 80% of the holding capacity of said weighing container, said weighing container being separated from the pre-filling chamber in front of it by a controllable flap, and after the weighing has taken place the material is ejected from the weighing container onto a mixing belt, characterized in that a desired theoretical weight curve is given for each fibrous component to a respective weighing device according to which curve the material feed for filling the weighing container is controlled by appropriately varying the transport speed.

20. The method according to claim 19 characterized in that the holding capacity of the pre-filling chamber is at least the holding capacity of the weighing chamber minus the amount of fine filling.

21. A control device for controlling the transport speed of a material feed device of a weighing feed device for mixing fibrous components during a weighing cycle in which the fibrous material to be dosed is transported by the material feed device into a weighing container characterized in that the desired theoretical weight curve is entered into the control device for the fibrous material to be dosed according to which curve the control device controls the material feed for the filling of the weighing container by varying the transport speed, said theoretical weight curve providing total weight of the transported fibrous material at a given time in the weighing cycle and is determined for each fibrous material component based on a predetermined relationship of feed rate of the transported fibrous material as a function of time over the weighing cycle to achieve a theoretical total weight of fibrous material to be transported into the weighing container during the weighing cycle.

* * * * *